(12) United States Patent
Bauder et al.

(10) Patent No.: US 7,976,603 B2
(45) Date of Patent: Jul. 12, 2011

(54) FILTER HOUSING

(75) Inventors: Ralf Bauder, Ketsch (DE); Klemens Dworatzek, Edingen (DE)

(73) Assignee: Mann+Hummel GmbH, Ludwigsburg (DE)

( * ) Notice: Subject to any disclaimer, the term of this patent is extended or adjusted under 35 U.S.C. 154(b) by 266 days.

(21) Appl. No.: 12/042,357

(22) Filed: Mar. 5, 2008

(65) Prior Publication Data

US 2008/0229722 A1 Sep. 25, 2008

(30) Foreign Application Priority Data

Mar. 5, 2007 (DE) .................... 20 2007 003 356 U

(51) Int. Cl.
*B01D 46/00* (2006.01)
*B65D 41/17* (2006.01)

(52) U.S. Cl. ......... 55/503; 55/385.3; 220/296; 220/315; 220/780; 220/784; 220/788; 220/794

(58) Field of Classification Search .............. 55/385.3, 55/503, 504; 220/296, 315, 780, 784, 787, 220/788, 789, 791, 794
See application file for complete search history.

(56) References Cited

U.S. PATENT DOCUMENTS

| | | | |
|---|---|---|---|
| 3,376,996 A * | 4/1968 | Bardell | 220/270 |
| 4,215,790 A * | 8/1980 | Ribble et al. | 220/240 |
| 4,245,753 A * | 1/1981 | Ellis | 220/288 |
| 4,245,754 A * | 1/1981 | Ellis | 220/304 |
| 5,755,842 A * | 5/1998 | Patel et al. | 55/330 |
| 6,402,798 B1 * | 6/2002 | Kallsen et al. | 55/385.3 |
| 6,436,162 B1 * | 8/2002 | Wake et al. | 55/498 |
| 6,695,891 B2 * | 2/2004 | Reid | 55/495 |
| 6,851,569 B2 * | 2/2005 | Conti et al. | 220/297 |
| 6,977,006 B2 * | 12/2005 | Reid | 55/495 |
| 7,070,642 B2 * | 7/2006 | Scott et al. | 55/498 |
| 2006/0121768 A1 | 6/2006 | Dworatzek et al. | |

FOREIGN PATENT DOCUMENTS

| | | |
|---|---|---|
| DE | 2243258 A1 | 3/1974 |
| DE | 3336882 A1 | 5/1985 |
| EP | 1102928 | 5/2001 |
| EP | 1661614 | 5/2006 |
| EP | 1132611 A | 7/2009 |
| GB | 1053111 | 12/1966 |

* cited by examiner

*Primary Examiner* — Robert A Clemente

(57) ABSTRACT

The invention concerns a filter housing (1), in particular of an air filter for motor vehicles, that extends axially along a longitudinal axis (2) and comprises two detachably connected housing parts (3, 4). A locking connection (5) acting in the direction of the longitudinal axis (2) is provided between the two housing parts (3, 4), wherein the locking connection (5) in at least one rotational direction (6) of the first housing part (3) about the longitudinal axis (2) relative to the second housing part (4) can be brought into a position in which the housing parts (3, 4) are detachable in the axial direction.

14 Claims, 3 Drawing Sheets

FILTER HOUSING

TECHNICAL FIELD

The invention relates to a filter housing, in particular of an air filter for motor vehicles with the features according to the preamble of claim 1.

PRIOR ART

Filter housings, in particular of an air filter for motor vehicles, have in prior art configuration two detachably connected housing parts that, in the mounted state, extend along a common longitudinal axis and are particularly of a cylindrical shape in this connection. One of the two housing parts is mounted stationarily while the other housing part, as a lid, can be detached as needed in order to change the filter element located inside. For the detachable connection of the two housing parts different configurations are known. Threaded and bayonet closures can be provided that for assembly of the lid part require a relative rotation of the lid part relative to the stationary housing part. This requires within certain limits a free rotation of the lid part relative to the stationary housing part. Attached hoses or the like, for example, for dust removal, limit such a free rotation. Alternatively, an axial plug connection can be provided that can be secured by toggle levers or the like. Often, spatially limited mounting conditions exist that make difficult the actuation of such toggle levers. In all aforementioned cases, the connection sets a fixed rotation angle position of the lid part relative to the lower housing part so that positional adjustments to spatial conditions are difficult.

In the aforementioned arrangements opening is done in a direction opposite to the closing direction. The closing, opening, and securing forces have an effect on one another and are adjustable relative to one another only with difficultly.

The invention has the object to further develop a filter housing such that its lid can be mounted and removed more easily.

This object is solved by a filter housing having the features of claim 1.

DISCLOSURE OF THE INVENTION

A filter housing is proposed in which a locking connection acting in the longitudinal direction of the housing is provided between both housing parts wherein the locking connection is releasable in at least one rotational direction of the first housing part about the longitudinal axis relative to the second housing part.

The proposed arrangement makes it possible that the first housing part that is configured as the lid part can be plugged axially, i.e., parallel to the longitudinal axis, onto the second generally stationary housing part wherein the axial plugging movement causes the locking connection to engage. Without further action, i.e., without actuation of levers or the like, the two housing parts are locked relative to one another simply as a result of the axial plug connection in the direction of the longitudinal axis. A rotational movement is not required so that attached hoses or the like do not impair the mounting process. When the axial locking connection is configured appropriately, during the plug-in step angular positional corrections can be carried out. In particular, plugging can be realized in different rotational angle positions that are matched to the respective mounting situation.

Detachment of the locking connection is however realized not in the direction of the longitudinal axis but by a relative rotation of the two housing parts relative to one another in at least one rotational direction. For producing the connection and for releasing it, two different degrees of movement are selected. This makes it possible to constructively determine the occurring closing, opening, and securing forces independent of one another and without affecting one another. In case of a suitable configuration, the axial locking connection can be brought into engagement with minimal closing forces and can generate great axial securing forces by doing so. Independent of this, in the rotational direction, i.e., transversely to the axial securing forces, a release of one housing part from the other housing part is realized. This can be realized despite the high securing forces of the locking connection with minimal manual forces. A suitable anti-rotation device avoids accidental detachment. For an appropriate design of the anti-rotation device the desired closing and holding forces in the axial direction are not affected. Closing and opening of the connection between the two housing parts can be realized even under limited spatial conditions in a simple way with minimal force expenditure.

In a preferred embodiment, for forming the locking connection at least one locking hook that is elastically deflectable in a radial direction can be provided on one housing part that engages at least one correlated locking edge on the other housing part in the direction of the longitudinal axis wherein the at least one locking hook and the at least one locking edge each have a free end relative to the at least one releasing rotational direction. The elastically deflectable locking hook can be brought into engagement with minimal mounting forces with the correlated locking edge wherein, despite the minimal mounting forces, high axial securing forces are generated in the locked state. The free ends of the locking hook and the locking edge in the releasing rotational direction enable a free rotation of the two housing parts relative to one another up to a rotational angle position in which the engagement of the locking hook and the correlated locking edge is canceled. In this rotational angle position one housing part can be pulled off the other housing part without considerable force expenditure.

In a preferred embodiment the at least one locking hook and/or the at least one locking edge have a rotational stop acting in a direction opposite to the releasing rotational direction. For avoiding faulty operation, this results in a single rotational direction for release. In the opposite rotational direction, the rotational stop prevents that the locking hook and the locking edge become disengaged from one another. Instead, the operator can feel based on the rotational stop a rotational angle position in which a complete engagement of the locking connection is ensured. By means of an appropriate spatial arrangement of the rotational stop a preferred rotational angle position of the removable housing part relative to the entire system can be predetermined in which position a proper function of the air filter is ensured.

Advantageously, at least two, and in particular three, groups of locking hooks and correlated locking edges are provided in uniform distribution about the circumference of the filter housing, wherein in one circumferential direction between the groups of locking edges free spaces for axial passage of the locking hooks are arranged. The occurring securing forces are distributed uniformly onto the respective groups of locking hooks and locking edges. Canted mounting and overloading of individual locking elements are avoided. For effecting a release, a rotational movement of one housing part relative to the other housing part takes place until the individual groups of locking hooks are in aligned position with the free spaces between the groups of locking edges. In this rotational angle position the locking connection of all groups is released at the same time. The housing part that is to be detached can be removed with minimal force expenditure from the other housing part in a direction parallel to the longitudinal direction, i.e., in the axial direction.

In an expedient further embodiment, at least one free space is limited in the releasing rotational direction by a rotational stop. This rotational stop enables the operator to easily find that rotational angle position in which the locking connection is disengaged and in which one housing part can be removed in the axial direction from the other housing part without impairment.

In a preferred embodiment, relative to the longitudinal axis at least two, and in particular four, locking hooks are arranged sequentially. This enables a reliable assembly even for slightly canted positioning of one housing part relative to the other housing part. Even for slightly canted positioning, first some of the locking hooks and locking edges engage one another so that the two housing parts are first provisionally fixed relative to one another. Subsequently, the two housing parts can be pushed axially against one another until all locking hooks have completely engaged all locking edges so that a cant-free attachment with high securing forces is ensured.

In a preferred embodiment, the locking edges have a greater extension than the correlated locking hooks relative to the circumferential direction. In particular, the locking hooks and the correlated free spaces between the locking edges extend relative to the circumferential direction about an angle of approximately 10° wherein the free spaces relative to the locking hooks are slightly oversized. This arrangement enables a secure placement of one housing part onto the other housing part in different relative rotational angle positions. The operator is not required to find an exact rotational angle position for assembly. Slight rotational angle errors during mounting can be corrected without problem after the locking connection has been produced by appropriate rotational movements. In connection with, for example, three groups of locking hooks and locking edges, a maximum angle of rotation of only 100° is required for releasing the locking connection; under conventional mounting conditions, this simplifies removal of the lid even for hose conduits being attached. The minimal oversize of the free spaces relative to the locking hooks ensures a free unhindered removal of one housing part from the other housing part in the axial direction.

In an expedient embodiment, the two housing parts each have in particular a cylindrical axial section that, in the mounted state, engage one another for generating a locking connection. Advantageously, the least one locking hook and the least one locking edge are provided on the inner side of the first axial section and on the outer side of the second axial section. The two engaging axial sections generate a precise positional alignment of the two housing parts relative to one another while at the same time sealing one another. By utilizing their, in particular, radial elasticity, an easily actuatable locking connection with high securing force is provided. In the mounted state, it is covered toward the exterior by mutual overlap of the two axial sections and is therefore protected from external influences. The cylindrical shape enables an easy relative rotation for releasing the locking connection.

In an advantageous embodiment, an anti-rotation device for securing the two housing parts relative to one another is provided wherein in particular an embodiment of the anti-rotation device is provided that automatically engages when axially connecting the two housing parts. The anti-rotation device avoids an accidental release of the two housing parts from one another. The automatic engagement enables an axial placement of one housing part onto the other housing part wherein without further measures by the operator the axially acting locking connection as well as the anti-rotation device are brought into engagement. Even for spatially limited mounting spaces a comfortable and simple mounting is possible while faulty operation is prevented.

BRIEF DESCRIPTION OF THE DRAWINGS

One embodiment of the invention will be explained in the following with the aid of the drawing in more detail. It is shown in.

EMBODIMENT(S) OF THE INVENTION

Figure 1:
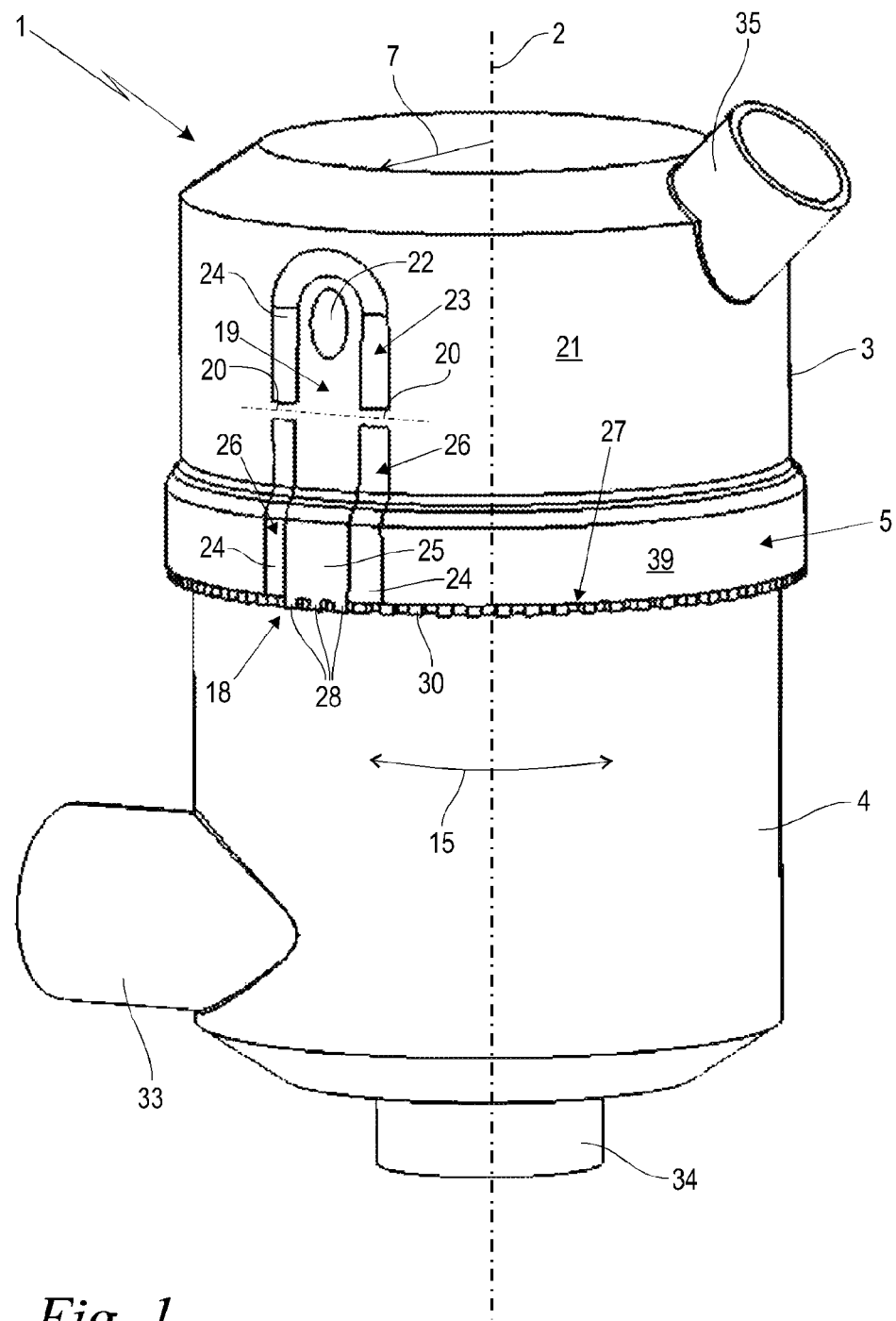
FIG. 1 in a perspective illustration a filter housing according to the invention exemplified by an air filter housing with mounted lid part secured in the rotational direction.

FIG. 1 shows in a perspective illustration a filter housing 1 according to the invention exemplified by an air filter housing of a motor vehicle. The filter housing 1 as a whole is cylindrical and extends along a longitudinal axis 2. For forming the filter housing 1, two detachably connected housing parts 3, 4 are provided that are arranged coaxially relative to the longitudinal axis 2. By means of the approximately cylindrical configuration a radial direction 7 and a circumferential direction 15 are provided.

The filter housing 1 receives an exchangeable filter body, not illustrated. An air flow to be filtered is guided into the filter housing at the unfiltered side through an air intake 33, is filtered by the inwardly positioned filter body, and subsequently removed coaxially to the longitudinal axis 2 through of the air outlet 34 at the filtered side. The air intake 33 and the air outlet 34 are monolithically formed on the lower bottom part 4 and together with it are fixed within the system. The upper housing part 3 that can be removed from the stationarily secured housing part 4 is a lid part provided with a monolithically formed dust removal socket 35 to which is connected a hose, not illustrated, of the entire system, also not illustrated. As needed, dust that has been retained in the filter element can be removed by means of the dust removal socket 35 and the hose connected thereto from the interior of the filter housing 1. When removing the upper housing part 3 from the lower housing part 4, the hose remains on the dust removal socket 35. In the demounted state of the upper housing part 3 cleaning and maintenance work and in particular an exchange of the filter element can be carried out. In the illustrated mounted state, a locking connection 5 disclosed in more detail in the following secures the two housing parts 3, 4 in the direction of the longitudinal axis 2 to one another. Moreover, an anti-rotation device 18 is provided that, in the illustrated mounted state, prevents accidental relative rotation of the two housing parts 3, 4 relative to one another about the longitudinal axis 2 in the circumferential direction 15.

Figure 2:
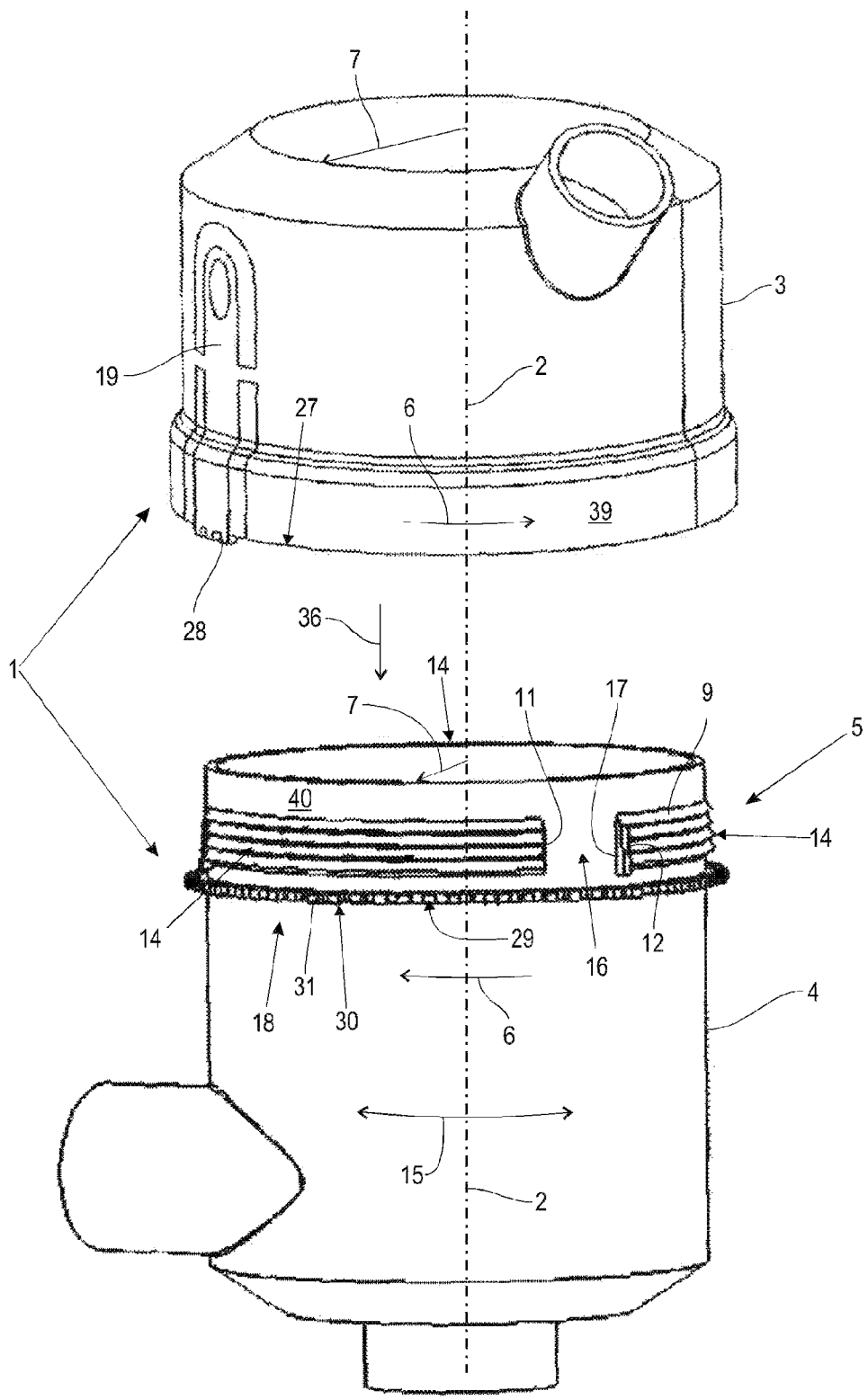
FIG. 2 the arrangement according to FIG. 1 with lid part removed from the stationary housing part as well as indications regarding the connection, release and the anti-rotation device of the lid part relative to the stationary housing part.

The anti-rotation device 18 comprises a toothed securing ring 30 that surrounds the circumferential wall of the lower housing part 4. In the area of a housing edge 27 that also extends circumferentially in a circular shape, the upper housing part 3 engages with cylindrical axial section 39 a section 40 of the lower housing part 4 that is also cylindrical and is illustrated in FIG. 2, wherein the housing edge 27 of the upper housing part 3 rests axially against the securing ring 30 of the lower housing part 4.

The anti-rotation device 18 comprises moreover an actuation lever 19 whose lever axis 20 extends tangentially to the circumferential contour of the housing part 3, i.e., in the circumferential direction 15. The actuation lever 19 together with its lever axis 20 is formed as an integral and monolithic part of a cylindrical wall 21 of the upper housing part 3 that extends in the circumferential direction. The actuation lever 19 is integrated into the wall 21 of the housing part 3 in such a way that its outer surface is aligned at least approximately with the outer surface of the wall 21. The outer surface of the actuation lever 19 is therefore part of the cylindrical outer contour of the wall 21.

The actuation lever 19 extends parallel to the longitudinal axis 2 and has an actuating end 22 as well as a securing end 25. The securing end 25 is facing the housing edge 27 and the adjoining housing part 4 while the actuating end 22 relative to the lever axis 20 is positioned opposite the securing end 25, i.e., facing away from the housing edge 27 and the housing part 4.

Between the actuation end 22 and the adjoining area of the wall 21 an approximately U-shaped gap 23 is provided; its two legs end at the lever axis 20, and the gap extends about the remaining outer contour of the actuation end 22. Between the securing end 25 and the adjoining area of the wall 21, a gap 26 each is arranged on both sides relative to the circumferential direction 15 wherein both gaps 26 extend parallel to the longitudinal axis 2 from the housing edge 27 to the lever axis 20. All gaps 23, 26, are filled with an elastomer 24. In the illustrated embodiment, the housing part 3 inclusive of the wall 21, the actuation lever 19 and the elastomer 24 filling the gaps 23, 26, is configured as a two-component injection molded part. It can also be expedient to employ instead of the elastomer 24 an elastically deformable thin wall section of the wall 21. As a whole, a housing part 3 or a filter housing 1 is provided which, particularly in the area of the anti-rotation device 18 or the actuation lever 19, is impermeable to flow and is hermetically sealed.

On the securing end 25 of the actuation lever 19 there is advantageously at least one securing finger 28 that extends parallel to the longitudinal axis 2. In the illustrated embodiment a total of three securing fingers 28 are provided that project parallel to the longitudinal axis 2 past the housing edge 27 of the upper housing part 3 and, in a way to be described in more detail in the following, engage positive-lockingly the securing ring 30. By means of this positive-locking engagement the two housing parts 3, 4 cannot be rotated relative to one another about the longitudinal axis 2.

FIG. 2 shows the arrangement according to FIG. 1 with upper housing part 3 removed from the stationary housing part 4 wherein with reference to FIG. 1 same features are identified with same reference numerals. In the demounted state of the housing part 3 according to FIG. 2 maintenance work on the air filter and in particular an exchange of the filter element, not illustrated, arranged in the filter housing 1 can be performed.

After completion of maintenance work the upper housing part 3 is placed coaxially to the longitudinal axis 2 in accordance with arrow 36 onto the lower housing part 3 and is attached thereto by means of the locking connection 5 acting in the direction of the longitudinal axis 2 and to be explained in the following in more detail. For this purpose, the lower housing part 4 has a cylindrical axial section 40 that extends in the axial direction from the securing ring 30 to the free housing edge of the housing part 4. Relative to the cylindrical axial section 40 of the lower housing part 4 the cylindrical axial section 39 of the upper housing part 3 has a minimally enlarged diameter wherein the inner diameter of the cylindrical axial section 39 corresponds substantially to the outer diameter of the cylindrical axial section 40. In this way, the upper housing part 3 can be plugged axially with its axial section 39 onto the cylindrical axial section 40 of the lower housing part 4 so as to overlap. Instead of the cylindrical configuration of the axial sections 39, 40 a conical configuration can also be expedient.

Figure 3:
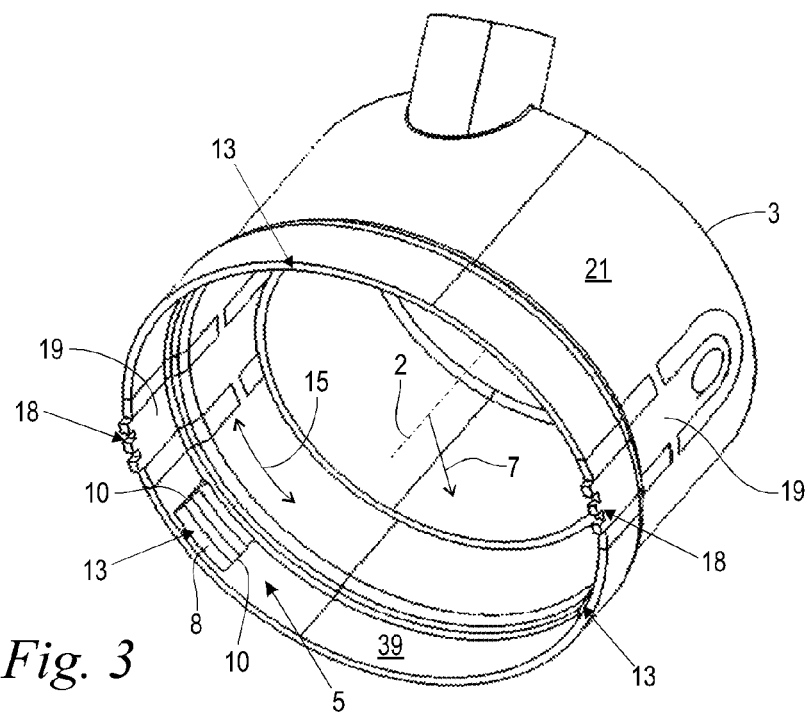
FIG. 3 in a perspective interior view the lid part according to FIG. 1 and FIG. 2 with details of its inwardly positioned locking hooks.

For forming the locking connection 5 at least one locking hook 8 that can be elastically deflected in the radial direction 7 and that is shown in FIG. 3 is provided that engages in the direction of longitudinal axis 2 at least one correlated locking edge 9 (FIG. 2) of the adjoining housing part 4. When looking at FIG. 2 and FIG. 3, it can be seen that at least two, and in the illustrated embodiment 3 at least three, groups 13, 14 of locking hooks 8 and correlated locking edges 9 are distributed uniformly about the circumference of the filter housing 1. Each group 13 of locking hooks 8 comprises at least two, and in the illustrated embodiment four, locking hooks that relative to the longitudinal axis 2 are distributed sequentially at uniform spacings. The groups 13 of locking hooks 8 are arranged on the inner side of the axial section 39 and are formed as a monolithic part thereof. The wall 21 of the housing part 3 that is injection-molded from plastic material is elastically embodied in the area of the axial section 39 with the groups 13 of locking hooks 8 in such a way that the locking hooks 8 upon radial loading in the radial direction 7 can widen elastically. The locking hooks 8 project opposite to the radial direction 7 inwardly past the contour of the axial section 39 of the wall 21 in such a way that in the circumferential direction 15 they have on both sides a free end 10 without stop or other mechanical limitation. In this connection, all locking hooks 8 or all groups 13 of locking hooks 8 relative to the circumferential direction 15 extends across an angle of approximately 10°.

The illustration according to FIG. 2 shows that also the locking edges 9 in accordance with groups 13 of FIG. 3 are provided in the same number, i.e., three groups 14 of locking edges 9 are arranged that are also uniformly distributed about the circumference of the filter housing 1 or the housing part 4 and are monolithically formed on the exterior side of the axial section 40 of the housing part 4. Each group 14 has in a matching arrangement with the groups 13 according to FIG. 3 the same number, i.e., a total of four locking edges 9, that relative to the longitudinal axis 2 are arranged sequentially at the same spacing to one another. Relative to the circumferential direction 15 all groups 14 of locking edges 9 extends about an angle of approximately 110° so that between the individual groups 14 free spaces 16 at an angle of approximately 10° remain in the circumferential direction. The angle of the free spaces 16 is slightly oversized relative to the angle of the groups 13 of locking hooks 8 (FIG. 3) in the circumferential direction 15.

All locking edges 9 project in the radial direction 7 past the cylindrical circumferential contour for of the housing part 4 wherein in analogy to the locking hooks according to FIG. 3 it can be expedient to provide relative to the circumferential direction 15 on either side a free end 11. Inasmuch as the anti-rotation device 18 is not in engagement, this enables in the mounted state a free rotation of the two housing parts 3, 4 relative to one another. In the illustrated embodiment, each locking edge 9 or each group 14 of locking edges 9 has a free end 11 in the circumferential direction 15 at one side while they are limited at the opposite end by integrally formed ribs for providing the rotational stops 12, 17. In analogy to the description of the housing part 3 according to FIG. 3, the circumferential wall of the housing part 4 in the area of the axial section 40 with the locking edges 9 is also elastically designed in such a way that the locking edges 9 under radial load opposite to the radial direction 7 can be pressed slightly inwardly toward the longitudinal axis 2.

Mounting of the upper housing part 3 on the lower housing part 4 is realized in accordance with the illustration of FIG. 2 in that the upper housing part 3 is axially pushed on in a desired rotational angle position in accordance with arrow 36 onto the lower housing part 4. Ramp surfaces of the locking hooks 8 (FIG. 3) and of an a locking edges (9 (FIG. 2) effect a radial deflection so that the locking hooks 8 (FIG. 3) can move across the locking edges until the housing edge 27 (FIG. 1) of the upper housing part 3 will rest against the securing ring 30 of the lower housing part 4. In the predetermined rotational angle position of the housing part 3 relative to the housing part 4 all locking hooks 8 (FIG. 3) engage the correlated locking edges 9 wherein the locking surfaces, not identified in more detail, of the locking hooks 8 and the locking edges 9 secure the upper housing part 3 relative to the lower housing part 4 at a high securing force that cannot be released easily. In accordance with the illustration of FIG. 1, the axial sections 39, 40 engage one another wherein the radial outer axial section 39 covers the locking connection 5 with the locking hooks 8 and locking edges 9. It can also be expedient that the two housing parts 3, 4 in the mounted state abut one another with their free edges are sealed relative to one another with appropriate axial sealing means. The locking connection 5 can be, for example, produced by spring tongues of one housing part 3, 4 that lockingly engage the other housing part 4, 3. Producing and releasing the connection are realized in the afore described way.

The illustration according to FIG. 2 shows that the securing ring 30 has securing openings 29 uniformly distributed about the circumference wherein teeth 31 of the securing ring 30 that are uniformly distributed about the circumference and that project in the radial direction 7 are provided and wherein the securing openings 29 are produced by open intermediate spaces between the teeth 31 that are open outwardly in the radial direction. The teeth 31 and the securing openings 29 are matched in their shape and circumferential distribution to the shape and circumferential distribution of the securing fingers 28 so that in the afore described mounted state of the housing part 3 the securing fingers 28 engage the corresponding securing openings 29. This also has the effect that the anti-rotation device 18 for the two housing parts 3, 4 engages automatically upon axial connection of the two housing parts 3, 4. Without active actuation of the actuation of the actuation lever 19 the securing fingers 28 are automatically inserted into the securing openings 29 when axially plugging the housing part 3 into the housing part 4 in accordance with arrow 36 (FIG. 2) so that the anti-rotation device 18 in accordance with the illustration of FIG. 1 is in engagement and an accidental rotation of two housing parts 3, 4 relative to one another is prevented.

When locking at FIG. 3 it can be seen that a total of two diametrically opposed identically designed actuation levers 19 are provided so that a twin anti-rotation device 18 is provided that is uniformly distributed about the circumference. The greater extension of the locking edges 9 in comparison to be correlated locking hooks 8 in the circumferential direction 15 enables plugging of the upper housing part 3 onto the lower housing part 4 in different angular positions. The sequence of teeth 31 and securing openings 29 is arranged without interruptions about the circumference of the securing ring 30 so that in any desired rotational angle position the securing fingers 29 can engage suitable securing openings 29.

Figure 4:
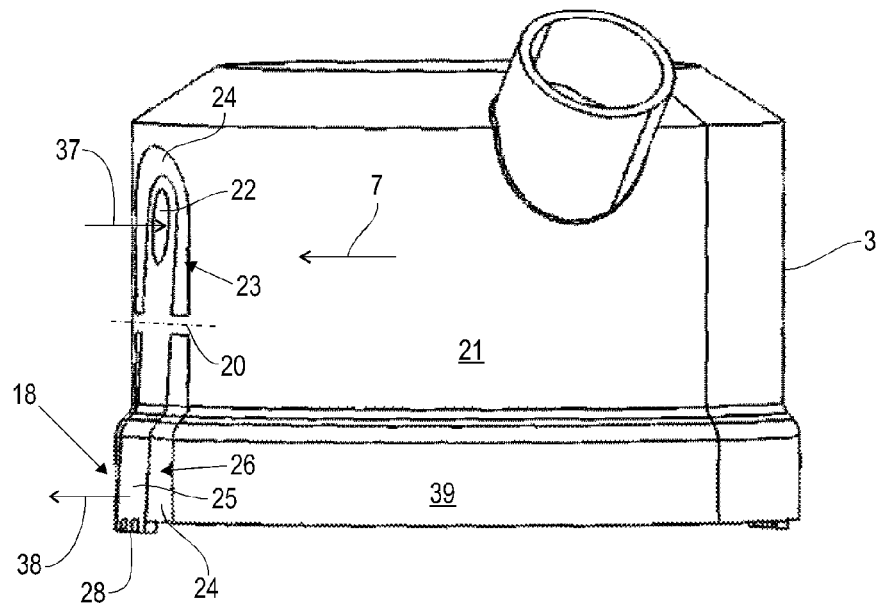
FIG. 4 a side view of the lid part according to FIGS. 1 to 3 with released anti-rotation device.

The releasing action of the anti-rotation device 18 can be seen when locking at FIG. 2 and FIG. 4. By manual pressure applied onto the actuation end 22 of the actuation lever 19 in opposite direction to the radial direction 7, the lever 19 is pressed in accordance with arrow 37 radially inwardly. The injection-molded plastic lever axis 20 that is a monolithic part of the actuation lever 19 and of the wall 21 of the housing part 3 is subjected to a torsional deformation as a result of its elastic properties; as a result of this, the securing end 25 opposite the actuation end 22 is moved outwardly in the radial direction 7 in accordance with arrow 38. The elastomer 24 that, in comparison to the limited elastic yielding of the plastic material of the housing part 3, is significantly softer and more yielding enables manual pivoting of the actuation lever 19 about the lever axis 20 wherein the gaps 23, 26 remain sealed even in the deflected state in accordance with illustration of FIG. 4. Since according to the illustration of FIG. 3 two identically designed actuation levers 19 are positioned opposite one another, both actuation ends 22 can be suppressed simultaneously by one hand. The securing fingers 28 that are located on the securing end 25 are lifted out of the securing openings 29 between the teeth 31 that are open in the radial direction 7 so that the anti-rotation device 18 is released. The two housing parts 3, 4 can thus be rotated relative to one another.

Such a mutual rotation enables in particular in the engaged state of the axial locking connection 5 a rotational angle correction of the housing part 3 embodied as the lid part relative to the housing part 4 that is mounted stationarily within the system. For finding the predetermined rotational angle position in particular the rotational stop 12 is provided as will be described in the following.

In accordance with the illustration of FIG. 2 a relative rotational direction of the two housing parts 3, 4 relative to one another is indicated by a pair of arrows 6 wherein the locking connection 5 can be released by a relative rotation of the two housing parts 3, 4 in this rotational direction 6 about the longitudinal axis 2. As described above, the locking hooks 8 (FIG. 3) as well as the locking edges 9 (FIG. 2) relative to this releasing rotational direction 6 each have a free end 10, 11. According to FIG. 2 all locking edge 9 are provided with rotational stops 12 that act in a direction opposite to the rotational direction 6. By rotation of the upper housing part 3 relative to the lower housing part 4 when the anti-rotation device 18 is released, the groups 13 of locking hooks 8 illustrated in FIG. 3 are brought into contact with the rotational stops 12 illustrated in FIG. 2. After releasing the actuation lever 19, the torsional effect of the elastically deformed lever axis 20, enhanced by the elastic spring force of the elastomer 24 (FIG. 4), forces the securing fingers 28 again into the correlated securing openings 29 (FIG. 2) so that the housing part 3 is secured in its predetermined rotational angle position relative to the housing part 4 in accordance with illustration of FIG. 1.

For releasing the connection between the two housing parts 3, 4 first the anti-rotation device 18 is first released in the afore described way. Subsequently, the operator carries out a relative rotation of the two housing parts 3, 4 in the releasing rotational direction 6. In particular for a stationary lower housing part 4 the upper housing part is rotated in accordance with the correlated arrow 6 until the groups 13 of locking hooks 8 illustrated in FIG. 3 will overlap the free spaces 16 between the groups 14 of locking edges 9 (FIG. 2). For finding this rotational angle position, at least one free space 16 in the releasing rotational direction 6 is limited by a rotational stop 17. In the illustrated embodiment, all free spaces 16 each have such a rotational stop 17. The housing part 3 is rotated in the releasing rotational direction 6 until the groups 13 of locking hooks 8 (FIG. 3) in the releasing rotational direction 6 come to rest against the correlated rotational stops 17. In this connection, the upper housing part 3 can be removed axially from the lower housing part 4 in the direction of the arrow 36. The minimal oversize of the free spaces 16 in the circumferential direction 15 relative to the correlated locking hooks 8 makes it possible to remove the respective groups 13 of locking hooks 8 (FIG. 3) through the free spaces 16 without any resistance.

It can also be expedient to eliminate the two rotational stops 12, 17. In this case, the locking edge 9 each have free ends 11 in analogy to the free ends of the locking hooks 8 at both ends according to FIG. 3 in both circumferential directions 15. In this case, two oppositely releasing rotational directions 6 are provided.

A further advantageous embodiment can reside in that the locking edges 9 in comparison to the locking hooks 8 are of a rigid configuration wherein an elastic deformation for producing the locking connection 5 is essentially completely effected by the locking hooks 8. Moreover, it can be expedient to provide the locking hooks 8 at the lower housing part 4 and the locking edges 9 at the upper housing part 3. It is also possible to integrate the actuation lever 19 into the lower stationary housing part 4.

What is claimed is:

1. An air filter housing comprising:
    a first air filter housing part and
    a second air filter housing part that are connected to one another to form the filter housing, wherein the filter housing has a longitudinal axis, an air intake port and an air outlet port;
    an anti-rotation device operable to prevent rotation of said first and second housing parts relative to each other, said anti-rotation device including
        a toothed securing ring secured on a circumferential wall of said second housing part;
        an elongated actuation lever elongated in a direction coinciding with said longitudinal axis of said filter housing, said actuation lever integrated into and forming a portion of a circumferential wall of said first housing part, said elongated actuation lever and said circumferential wall each separating an interior of said filter housing from an exterior of said filter housing, said elongated actuation lever formed as a pivotable deflectable portion of said circumferential wall, said actuation lever including
            an actuating end; and
            an opposing securing end;
        wherein said securing end lockably engages said second housing part preventing said relative rotation;
    a locking connection that acts in a direction of the longitudinal axis and connects the first and second housing parts releasably to one another;
    wherein the locking connection has a release position when rotating the first housing part in at least one releasing rotational direction relative to the second housing part about the longitudinal axis,
    wherein in the release position the first and second housing parts are released from one another in the direction of the longitudinal axis,
    wherein the locking connection comprises at least one locking hook on the first housing part, said at least one locking hook projecting radially from said first housing part,
    wherein the at least one locking hook is elastically deflectable in a radial direction,
    wherein the locking connection further comprises at least one locking edge on the second housing part, said at least one locking edge projecting radially from said second housing part,
    wherein the at least one locking hook engages in the direction of the longitudinal axis the at least one locking edge,
    wherein the at least one locking hook and the at least one locking edge each have a free end relative to the at least one releasing rotational direction.

2. The filter housing according to claim 1, further comprising
    at least one rotational stop provided on the at least one locking hook or the at least one locking edge or on the at least one locking hook and the at least one locking edge,
    wherein the at least one rotational stop acts a direction opposite to the releasing rotational direction.

3. The filter housing according to claim 1, wherein
    at least two groups of the at least one locking hook and at least two groups of the at least one locking edge are uniformly distributed in a circumferential direction of the first and second housing parts, respectively,
    wherein in the circumferential direction free spaces are provided between the groups of the at least one locking edge,
    wherein the free spaces enable axial passage of the locking hooks.

4. The filter housing according to claim 3, wherein at least one of the free spaces is limited by a rotational stop in the releasing rotational direction.

5. The filter housing according to claim 3, wherein
    the locking hooks and the free spaces between the locking edges, relative to the circumferential direction, extend about an angle of approximately 10,
    wherein the free spaces relative to the locking hooks are slightly oversized.

6. The filter housing according to claim 1, wherein, relative to the longitudinal axis, at least two of the at least one locking hook are arranged sequentially.

7. The filter housing according to claim 1, wherein, relative to the longitudinal axis, at least two of the at least one locking edge are arranged sequentially.

8. The filter housing according to claim 1, wherein the at least one locking edge, relative to a circumferential direction of the filter housing, has a greater extension than the at least one locking hook.

9. The filter housing according to claim 1, wherein
    the first housing part has a first cylindrical axial section and wherein the second housing part has a second cylindrical axial section,
    wherein the first and second cylindrical axial sections engage one another in a mounted state of the filter housing,
    wherein the at least one locking hook is arranged on an inner side of the first cylindrical axial section and the at least one locking edge is arranged on an exterior side of the second cylindrical axial section.

10. The filter housing according to claim 1, further comprising an anti-rotation device for securing the two housing parts relative to one another.

11. The filter housing according to claim 10, wherein the anti-rotation device engages automatically when the first and second housing parts are axially connected to one another.

12. The filter housing according to claim 1, further comprising:
   a toothed securing ring secured on a circumferential wall of said second housing part;
   wherein said securing end of said actuation lever includes teeth lockably engaging said toothed securing ring preventing said relative rotation,
   wherein said actuating end pivots in a radially inward direction to pivotally disengage said securing end from said securing ring.

13. The filter housing according to claim 12, further comprising
   at least one rotational stop provided on the at least one locking hook or the at least one locking edge or on the at least one locking hook and the at least one locking edge,
   wherein the at least one rotational stop acts a direction opposite to the releasing rotational direction, and
   wherein said rotational stop is an axial rib arranged on an end of said at least one locking hook or the at least one locking edge, said rotational stop stopping rotational position of said first and second housing parts in a position where a complete engagement of said locking connection is assured.

14. The filter housing according to claim 12, wherein an outer surface of said actuation lever is at least approximately aligned with an outer surface of said circumferential wall of said first housing part.

* * * * *